United States Patent [19]

Milberger et al.

[11] 3,919,257
[45] Nov. 11, 1975

[54] CATALYTIC VAPOR PHASE OXIDATION OF N-BUTENE TO MALEIC ANHYDRIDE USING TWO DIFFERENT CATALYSTS MAINTAINED IN TWO DISTINCT AND SEPARATE PORTIONS OF THE REACTION ZONE

[75] Inventors: Ernest C. Milberger, Solon; Serge R. Dolhyj, Parma; Steven J. Miko, Lyndhurst, all of Ohio

[73] Assignee: The Standard Oil Company, Cleveland, Ohio

[22] Filed: Feb. 9, 1973

[21] Appl. No.: 331,088

[52] U.S. Cl. ............................. 260/346.8; 260/533
[51] Int. Cl.² .................................. C07D 307/60
[58] Field of Search ...... 260/346.8 A, 680 E, 533 N

[56] References Cited
UNITED STATES PATENTS 3,221,049  11/1965  Riemenschneider et al. ...... 260/533
3,642,930  2/1972  Grasselli et al. .............. 260/680 E

FOREIGN PATENTS OR APPLICATIONS 1,157,117  7/1969  United Kingdom .......... 260/346.8 A

OTHER PUBLICATIONS

Ai et al., Bulletin of the Chemical Society of Japan (1971) Vol. 44, pp. 3081–3085.
Bissot et al., Industrial and Engineering Chemistry (I and EC) Product Research and Development (March 1963) Vol. 2, No. 1, pp. 57–60.

*Primary Examiner*—Henry R. Jiles
*Assistant Examiner*—Bernard I. Dentz
*Attorney, Agent, or Firm*—Herbert D. Knudsen

[57] ABSTRACT

Maleic anhydride is made from n-butane or n-butene in a tubular reactor having an undivided reaction zone which contains two different catalysts—the first catalyst converts at least part of the n-butane or n-butene to butadiene and the second catalyst converts at least part of this product to maleic anhydride.

4 Claims, 2 Drawing Figures

CATALYTIC VAPOR PHASE OXIDATION OF N-BUTENE TO MALEIC ANHYDRIDE USING TWO DIFFERENT CATALYSTS MAINTAINED IN TWO DISTINCT AND SEPARATE PORTIONS OF THE REACTION ZONE

BACKGROUND OF THE INVENTION

The preparation of maleic anhydride from n-butane, n-butane and butadiene is shown in Ser. No. 67,269 filed Aug. 26, 1970; Ser. No. 177,105 filed Sept. 1, 1971; Ser. No. 250,660 filed May 5, 1972; and Ser. No. 296,759 filed Oct. 12, 1972. This reaction is utilized in the process of the present invention.

Also shown in the art are various oxidative dehydrogenation reactions, see for example U.S. Pat. Nos. 3,414,631 and 3,642,930. This reaction is also used in the present invention.

SUMMARY OF THE INVENTION

It has now been discovered according to the present invention that very desirable advantages in the process for the preparation of maleic anhydride are realized by contacting in an undivided reaction zone of a tubular reactor a mixture of n-butane or n-butene and molecular oxygen with a first catalyst in a first portion of said tubular reactor to produce a product wherein at least part of the n-butane or n-butene is converted to butadiene and then contacting said product with a second catalyst in a subsequent and second portion of said tubular reactor wherein maleic anhydride is produced. Large capital and operating costs are saved by this invention. Moreover, the present invention gives good conversions to maleic anhydride from a single pass of inexpensive reactants through the reactor. In contrast, the art processes would require either the extensive use of reactant recycling or use of an expensive reactant, butadiene, to obtain a desirable single pass conversion to maleic anhydride.

The invention is best described by reference to the drawing.

DESCRIPTION OF THE DRAWING

Referring to FIG. 1, the reactor consists of an outer enclosed shell, 1. This shell contains a plurality of tubes, 2, distributed lengthwise in the reactor. Each of the tubes, 2, of the reactor contain a first catalyst, 3, and a second catalyst, 4. The first catalyst, 3, is in a first portion of the tube, 2, which is closest to the reactant feed; and the second catalyst, 4, is in a second portion of the tube, 2, which is closest to the product exit.

n-Butane or n-butene is fed to a header through line, 5, and air is fed through line, 7, to a common mixing tube. In the mixing tube, the n-butane or n-butene is mixed with air and communicated from the header, 6, to the tubes, 2. In the tubes, 2, the mixture of n-butane or n-butene and air contacts the first catalyst, 3, and then the second catalyst, 4, as it passes upward through the tubes, 2. In the tubes, 2, the n-butane or n-butene fed is converted to maleic anhydride.

The tube effluent is collected in receiver, 8, and transmitted through exit line, 9, to recovery and purification operations which are not shown.

During the operation of the reactor, each tube, 2, is completely surrounded by thermal control fluid, 10.

The thermal control fluid, 10, controls the temperature of the reaction to the desired level. The thermal control fluid, 10, is circulated throughout the inside of the shell, 1, by stirring mechanism, 11.

To remove excess heat from the shell, 1, thermal control fluid, 10, is removed from the inside of the shell, 1, through line, 12, by means of pump, 13. The thermal control fluid, 10, is passed through a heat exchanger, 14, to cool the thermal control fluid, 10, and the cooled thermal control fluid, 10, is returned to the inside of the reactor shell, 1, by line, 15.

Figure 1:
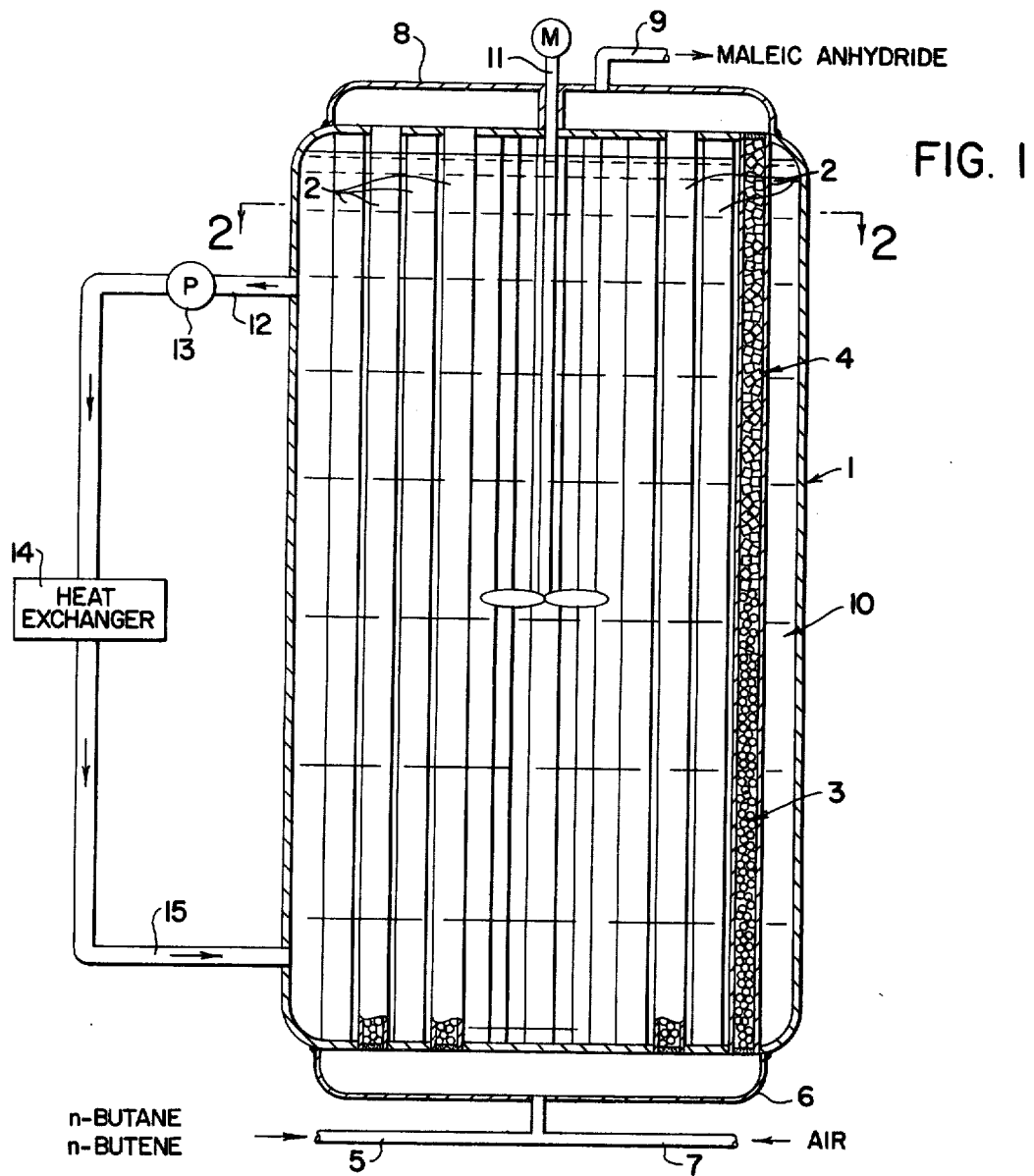
FIG. 1 shows a side view of the reactor of the invention.
Figure 2:
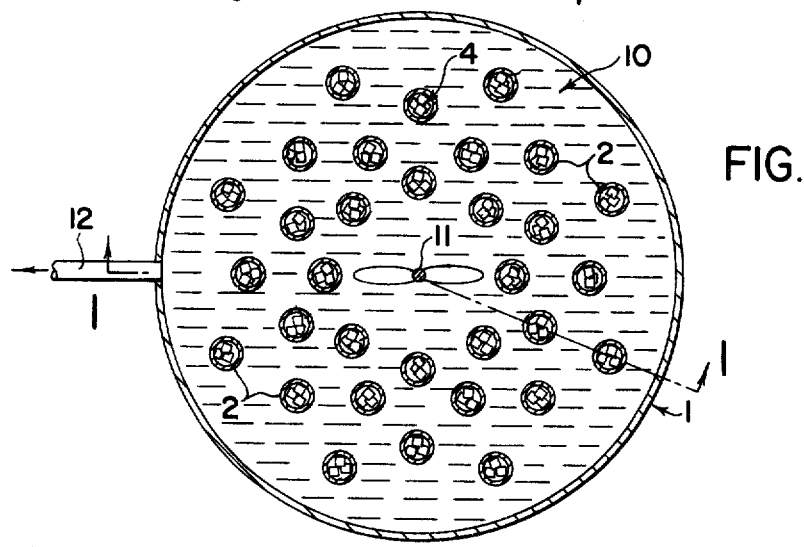
FIG. 2 shows a top view of the same reactor.

Referring to FIG. 2, it is seen that the reaction tubes, 2, are disbursed throughout the inside of the shell, 1, and surrounded by the thermal control fluid, 10.

DISCUSSION OF THE PREFERRED EMBODIMENTS

The important and critical aspect of the present invention is the use of two catalysts in an undivided reaction zone of a tubular reactor. As noted, the first of these catalysts is especially effective for converting at least part of the n-butane or n-butene to butadiene. The second of the catalysts is especially effective for converting butadiene to maleic anhydride.

The relative amounts of the two catalysts in the two portions of the tubular reaction zone may vary widely and is dependent upon the particular catalysts involved and upon the feed employed. Normally, the reaction zone will contain at least about 10% by volume of either of the catalysts, the remaining 90% or less by volume being the other catalyst. In most situations, however, the reaction zone will contain at least about 25% by volume of either catalyst. Thus, for example, a reaction zone in the tube could be 90% by volume the first catalyst, and 10% by volume the second catalyst; or it could be 25% the first catalyst, and 75% the second catalyst.

The catalysts of the invention are fixed bed catalysts. They may be placed in the tubes in any form, such as tablets, pellets or the like.

An important aspect of the invention is that there is substantially free communication between the first portion of the tube containing the first catalyst and the second portion of the tube containing the second catalyst. Of course, there may be some porous divider so long as the reactants can flow through the entire length of the reaction zone.

The first catalyst and the second catalyst are maintained in two distinct and separate portions of the reaction zone. This allows substantial completion of the oxidative dehydrogenation reaction before the second reaction begins.

In the preferred practice of the invention, the particular catalysts are important. However, in the broad concept of the invention the catalyst is not critical and can be selected from a wide range of catalysts that are known. The present invention does not rely broadly upon the particular catalyst employed, but upon the specific process in which the invention is employed. Thus, any catalyst that is capable of at least partially oxidatively dehydrogenating n-butane or n-butene to butadiene can be employed as the first catalyst. Likewise, any catalyst that can convert n-aliphatic hydrocarbons of four carbons to maleic anhydride can be used as the second catalyst.

In the preferred practice of the invention, the particular catalysts employed as the first and second catalysts are important.

For use as the first catalyst that oxydehydrogenates n-butane or n-butene, preferred catalysts have the formula $$A_a B_b Fe_c Bi_d D_e Mo_f O_x$$

wherein
A is an alkali metal, alkaline earth metal, rare earth metal, Nb, Ta, Tl or mixture thereof;
B is Ni, Co or mixture thereof;
D is P, As, Sb or mixture thereof;
and wherein
$a$ is 0 to about 8;
$b$ is 0 to about 12;
$c$ and $d$ are 0.1 to about 10;
$e$ is 0 to about 3;
$f$ is about 8 to about 16;
$x$ is a number required to satisfy the valence requirements of the other elements present.

These catalysts have been found to be extremely effective in oxydehydrogenation.

For use as the second catalyst that converts the hydrocarbons to maleic anhydride, preferred catalysts have the formula $$A_a V_b Fe_c Sb_d Mo_e O_x$$

wherein
A is a metal oxide, Te, P, As or mixture thereof
$a$ to 0 to about 3;
$b$ and $c$ are 0 to about 6;
$d$ and $e$ are 0.1 to 12;
$d + e$ is greater than $a + b + c$;
$x$ is the number of oxygens to satisfy the valence requirements of the other elements present.

Most preferred are those catalysts with optional promoters of Al, Cr, Co, Ni, Cu, Bi, Te, B, P, W or mixture thereof. These catalysts are especially effective in the preparation of maleic anhydride.

Both of the catalysts used in the present invention are conveniently prepared by techniques that are shown in the art. Most preferred are preparations in the applications described in the Background of the Invention.

The reactant feeds, ratios and conditions for these reactions are known from the art. The reaction is conducted within the range of about 200° to about 600°C., and the air-to-hydrocarbon ratio is preferably about 15–50 or more, with the use of the lowest air ratio possible being preferred.

One significant aspect of the preferred practice of the invention is that the temperature of the reaction is substantially uniform throughout the length of the reaction zone in the tubular reactor. This is accomplished by means of the temperature control fluid which is normally a highly stable heat transfer fluid or molten salt. This temperature control fluid is circulated in contact with the tubes so that heat generated in the reaction is transferred to the fluid.

The most surprising aspect of the present invention is that two different reactions can be compatibly run at a single reaction zone to obtain extremely high yields. It would be expected that one of the two reactions would dominate and that a poor yield of maleic anhydride would be obtained.

The reaction can be conducted with a reactant feed that contains any one or mixture of n-butane, n-2-butenes or n-1-butene. Other hydrocarbons such as propane, propylene or butadiene could also be included in the feed without deleteriously affecting the reaction.

The total feed of air and hydrocarbon is preferably fed to the reactor at one point as shown in the drawing. This eliminates the cost of secondary air injections.

Using the present invention, very desirable per pass conversions of n-butane or n-butene to maleic anhydride are obtained. These conversions are higher than any single-reactor reaction conducted in the art.

SPECIFIC EMBODIMENT

Example — Reaction of mixed n-butene feed

A reactor was constructed of a 0.884 inch inside diameter stainless steel pipe, 9.5 foot long. The reactor was detachably mounted to a reactant feed on one end and on the other end to a product recovery system.

A catalyst consisting of $K_{0.1}Ni_{2.5}Co_{4.5}Fe_3Bi_1P_{0.5}Mo_{1.2}O_x$ was prepared by the method of U.S. Pat. No. 3,642,930 and mounted on ⅛ inch Alundum spheres as described in Ser. No. 296,759 filed Oct. 12, 1972. The catalyst had a 33.3 weight % coating of the active ingredients on the outer surface of the support. In the same manner, a catalyst of the formula $V_{0.1}Fe_{0.2}SbMo_3O_x + W° 0.06$ was prepared according to Ser. No. 250,660 filed May 5, 1972, and was coated on ⅛ inch Alundum spheres to give second catalyst.

The first portion of the reaction zone of the tube was filled with 3.2 foot of the first catalyst nearest to the reactant feed. On top of this catalyst, without any separating barrier was placed 6.3 foot of the second catalyst in a second portion of the reaction zone. The reaction tube was connected to the reactant feed and product recovery and placed in a constant temperature bath.

The bath temperature was maintained at 372°C. while an air-hydrocarbon mixture having a molar ratio of 26 was fed through the tube containing the two catalysts. The hydrocarbon feed had the following composition: 60 trans-butene-2, and 40 cis-butene-2.

The reactor was prerun for 8 hours, and product was then collected for 4 hours. Samples of the product were titrated with base to determine the total acid and analyzed by gas-liquid chromatography to determine the amount of products produced.

The results are stated in terms of percent per pass conversion which is the number of moles of product obtained × 100 divided by the moles of n-butene fed. The percent per pass conversion to maleic anhydride was 60 mole % (107 weight %). Thus, 0.93 lb. of butene is required to produce 1 pound of maleic anhydride. In addition to the maleic anhydride produced, the per pass conversion to acrylic acid was 8%, and the per pass conversion to butadiene was 5%.

It can be seen from this example that the process of the present invention offers a commercially feasible process for preparing maleic anhydride that has outstanding advantages over the prior art processes.

In the same manner as described by the process above, other catalysts could be used. The first catalyst could be replaced by $Fe_{4.5}Bi_{4.5}PMo_{12}O_x$, $K_{0.2}Mg_8Fe_2BiAs_{0.5}Mo_{12}O_x$, $CoMoO_4$, $Sb_2Sn_4O_x$, or $Tl_{0.3}Co_5Fe_2P_{0.5}Te_2Mo_{12}O_x$, and a desirable reaction is obtained.

Also, the second catalyst can be replaced by a catalyst of $Sb_2Mo_3O_x$, $Cu_{0.2}V_{0.1}Fe_{0.4}Sb_2Mo_9O_x$, or $Al_2Fe_{0.2}Bi_9Mo_{12}O_x$ and a desirable reaction is obtained.

We claim:
1. The process for the preparation of maleic anhydride comprising contacting in an undivided reaction zone of a tubular reactor a mixture of n-butene and molecular oxygen with a first catalyst of the formula

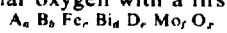

wherein
  A is an alkali metal, alkaline earth metal, rare earth metal, Nb, Ta, Tl or mixture thereof;
  B is Ni, Co or mixture thereof;
  D is P, As, Sb or mixture thereof;
and wherein
  $a$ is 0 to about 8;
  $b$ is 0 to about 12;
  $c$ and $d$ are 0.1 to about 10;
  $e$ is 0 to about 3;
  $f$ is about 8 to about 16;
  $x$ is a number required to satisfy the valence requirements of the other elements present
to produce a product wherein at least part of the n-butene fed is converted to butadiene and then contacting in a subsequent zone of said tubular reactor said product with a second catalyst of the formula

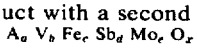

wherein
  A is a metal oxide, Te, P, As or mixture thereof;
  $a$ is 0 to about 3;
  $b$ and $c$ are 0 to about 6;
  $d$ and $e$ are 0.1 to 12;
  $d + e$ is greater than $a + b + c$;
  $x$ is the number of oxygens to satisfy the valence requirements of the other elements present
wherein maleic anhydride is produced.

2. The process of claim 1 wherein the temperature of the reaction is substantially uniform throughout the length of the reaction zone in the tubular reactor.

3. The process of claim 1 wherein A of the second catalyst formula is Al, Cr, Co, Ni, Cu, Bi, Te, B, P, W or mixture thereof.

4. The process of claim 1 wherein 2-n-butene is reacted, said first catalyst is $K_{0.1}Ni_{2.5}Co_{4.5}Fe_3Bi_1P_{0.5}Mo_{1.2}O_x$ and said second catalyst is $V_{0.1}Fe_{0.2}SbMo_3O_x + W°_{0.06}$.

* * * * *